(12) United States Patent
Jong et al.

(10) Patent No.: US 7,920,498 B2
(45) Date of Patent: Apr. 5, 2011

(54) METHOD AND APPARATUS FOR DECODING A CONTROL CHANNEL IN A WIRELESS COMMUNICATION SYSTEM

(75) Inventors: Il-Yong Jong, Yongin-si (KR); Hee-Su Kim, Seongnam-si (KR); Dong-Wook Seo, Suwon-si (KR); Gi-Bong Jeong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 571 days.

(21) Appl. No.: 11/623,924

(22) Filed: Jan. 17, 2007

(65) Prior Publication Data

US 2007/0165558 A1    Jul. 19, 2007

(30) Foreign Application Priority Data

Jan. 17, 2006  (KR) .................. 10-2006-0004787

(51) Int. Cl.
*G08C 17/00*  (2006.01)
(52) U.S. Cl. .................. 370/311; 455/343.2; 455/226.3; 455/434; 455/515
(58) Field of Classification Search .................. 370/311, 370/345, 347, 458, 442, 498, 537, 459, 474, 370/475, 432, 328–337; 455/434, 435.1, 455/435.2, 450, 574, 343.2–343.5, 515, 226.1–226.4; 375/340–343, 324–326, 136, 137
See application file for complete search history.

(56) References Cited

U.S. PATENT DOCUMENTS

| 6,185,432 | B1 | 2/2001 | Vembu | |
| 6,542,718 | B1 | 4/2003 | Kuo et al. | |
| 6,870,890 | B1 * | 3/2005 | Yellin et al. | 375/340 |
| 7,257,095 | B2 * | 8/2007 | Liu | 370/311 |
| 7,257,760 | B2 * | 8/2007 | Rick et al. | 714/760 |
| 7,751,356 | B2 * | 7/2010 | Kim et al. | 370/311 |
| 2001/0008838 | A1 | 7/2001 | Toskala et al. | |
| 2002/0049068 | A1 | 4/2002 | Koo et al. | |
| 2004/0004944 | A1 | 1/2004 | Petrus et al. | |
| 2004/0258139 | A1 * | 12/2004 | Namgoong et al. | 375/147 |

FOREIGN PATENT DOCUMENTS

| DE | 19813507 A1 | 9/1999 |
| WO | 2005055640 | 6/2005 |

* cited by examiner

*Primary Examiner* — Kamran Afshar
*Assistant Examiner* — Neda Behrooz
(74) *Attorney, Agent, or Firm* — F. Chau & Associates, LLC

(57) ABSTRACT

A method of decoding a control channel in a wireless communication system is provided. In the method, a terminal calculates the number of sub-bursts to be used during a next decoding and positions of the sub-bursts, based on a signal-to-noise ratio of at least one of a first burst or a second burst. Then, the terminal compares the calculated number of sub-bursts with a reference value. When the calculated number of sub-bursts is greater than the reference value, the terminal does not receive more bursts or sub-bursts and instead enters into a sleep state. When the calculated number of sub-bursts is smaller than or equal to the reference value, the terminal receives and decodes only sub-bursts at the calculated positions.

18 Claims, 3 Drawing Sheets

METHOD AND APPARATUS FOR DECODING A CONTROL CHANNEL IN A WIRELESS COMMUNICATION SYSTEM

CROSS-REFERENCE TO RELATED PATENT APPLICATION

This application claims priority to Korean Patent Application No. 10-2006-0004787, filed on Jan. 17, 2006, the disclosure of which is incorporated by reference in its entirety herein.

BACKGROUND OF THE INVENTION

1. Technical Field

The present disclosure relates to a decoding method and a decoding apparatus, and more particularly, to a method and apparatus for decoding a control channel using at least one sub-burst.

2. Discussion of the Related Art

Typically, terminals of a wireless communication system e.g., a mobile communication system) are designed to perform in one of several modes, such as, an active mode or an idle mode.

In the active mode, the terminal receives and transmits data, such as, voices, data, or images, from and to at least one base station included in the wireless communication system. In the idle mode, also called a standby mode, the terminal monitors a paging channel periodically to obtain messages. To obtain messages, the terminal also monitors a broadcast control channel and updates its system parameters.

In the idle mode, the terminal continuously consumes power to maintain the connections required to monitor signals output by the base stations of the wireless communication system, such as, a global system for mobile communications (GSM).

A portable terminal, such as, a mobile communications terminal, is supplied with power by its internal battery. Power consumption by the terminal in the idle mode causes available power of the internal battery to decrease.

To reduce the power consumption in the idle mode, messages are transmitted to the terminal through the paging channel. For example, in a GSM system, special time division multiple access (TDMA) frames are allocated to each terminal for its paging channel. Messages are transmitted to the terminals by using the TDMA frames. A paging message in a GSM denotes a message that is transmitted via a paging channel.

In a GSM system, a terminal periodically monitors a paging channel to obtain messages output by base stations included in the GSM system. The terminal awakes from a "sleep state" before receiving a TDMA frame which is firstly indicated for the paging channel, enters into an "awake state", receives all of the four bursts transmitted as a paging message, and processes the four bursts to recover the paging message. The terminal returns to the sleep state when additional communication is not needed.

Hence, it is desirable to reduce the power consumed by the terminal in the sleep state and in the awake state. In particular, the sleep state of a terminal lasts much longer than the awake state thereof, so that the power consumed by the terminal in an idle mode, particularly, in a sleep state, needs to be minimized in order to prolong the life of the internal battery of the terminal

SUMMARY OF THE INVENTION

According to an exemplary embodiment of the present invention, there is provided a method of decoding a control channel in a wireless communication system. The method includes a terminal calculating the number of sub-bursts to be used during a next decoding and positions of the sub-bursts, based on a signal-to-noise ratio (SNR) of at least one of a first burst or a second burst, the terminal comparing the calculated number of sub-bursts with a reference value, and the terminal receiving and decoding the calculated number of sub-bursts, or entering into a sleep state, based on a result of the comparison.

According to an exemplary embodiment of the present invention, there is provided a method of decoding a control channel in a wireless communication system. The method includes a terminal calculating a number of sub-bursts to be used during a next decoding based on at least one of a signal to noise ratio or Doppler frequency of at least one of a first burst or a second burst, and the terminal entering a sleep state without receiving a third burst transmitted via the control channel, when the calculated number of sub-bursts is greater than a reference value.

According to an exemplary embodiment of the present invention, there is provided a method of decoding a control channel in a wireless communication system. The method includes calculating a number of sub-bursts and positions of the sub-bursts to be used during a next decoding, based on at least one of a signal-to-noise ratio or Doppler frequency of at least one burst, receiving and decoding sub-bursts at the calculated positions to recover a message received via the control channel, and a terminal entering into a sleep state when the decoding is successful.

According to an exemplary embodiment of the present invention, there is provided a decoding performed by a terminal. The method includes calculating a number of sub-bursts to be used during a next decoding and positions of the sub-bursts based on at least one of a signal-to-noise ratio or Doppler frequency of at least one burst from among a plurality of bursts, comparing the calculated number of sub-bursts with a reference value, and receiving and decoding the calculated number of sub-bursts, or entering into a sleep state based on a result of the comparison.

According to an exemplary embodiment of the present invention, there is provided a wireless communication terminal. The wireless communication terminal includes a demodulator receiving and demodulating a message transmitted via a control channel in response to a control signal and outputting the demodulated message and an indication signal, a de-interleaver receiving and de-interleaving the demodulated message output by the demodulator, a decoder decoding a signal output by the de-interleaver and outputting a decoded signal, a block decoder decoding the decoded signal output by the decoder to recover a paging message and outputting the recovered paging message and a state of the recovered paging message, and a controller calculating a number of sub-bursts to be used during a next decoding and positions of the sub-bursts based on the indication signal, and performing either an operation of outputting the control signal for controlling an enable/disable operation of the demodulator or an operation of making the terminal enter into a sleep state, based on the result of the calculation.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 1:
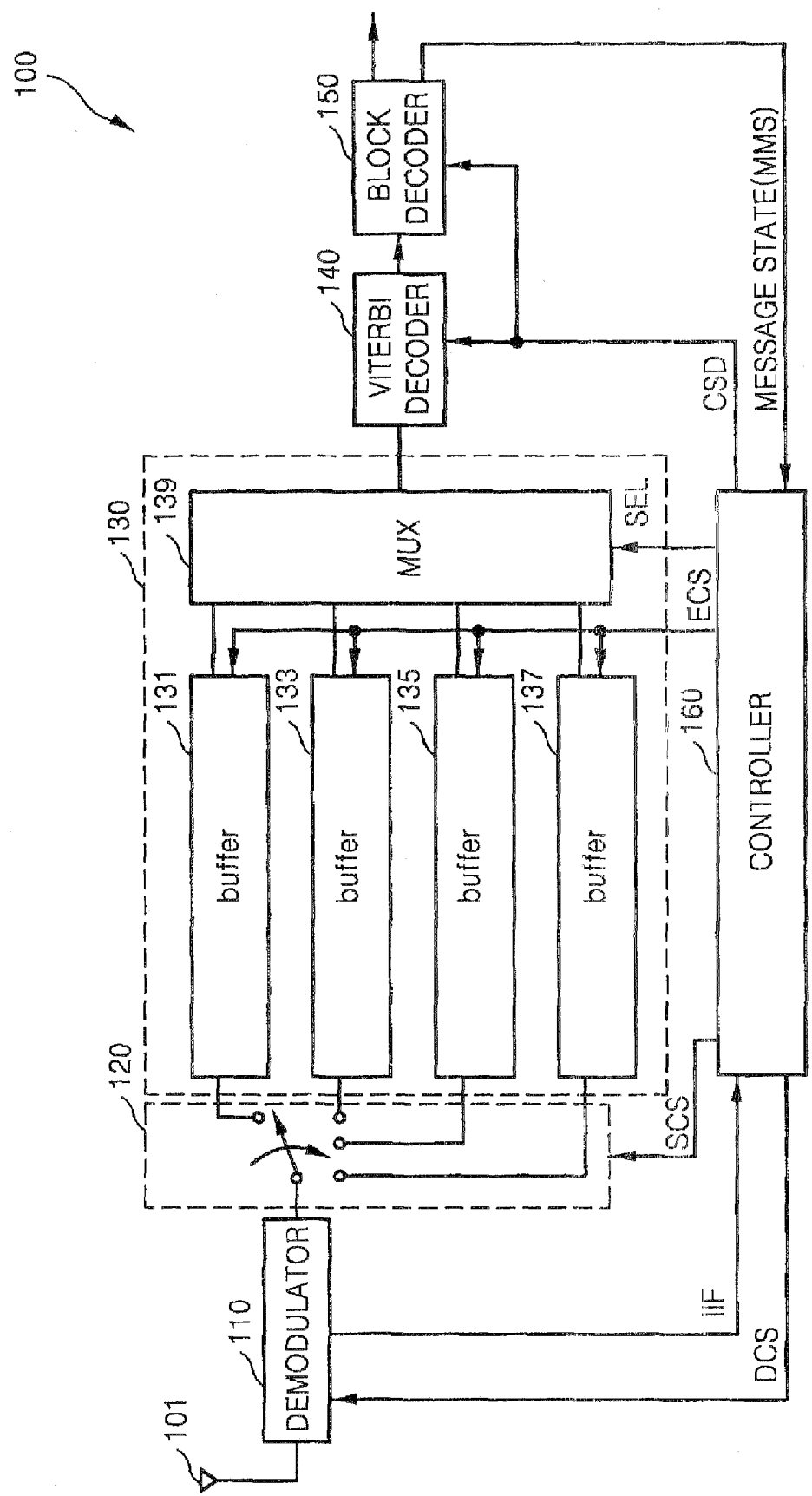
FIG. 1 is a block diagram of a terminal according to an exemplary embodiment of the present invention.
Figure 2:
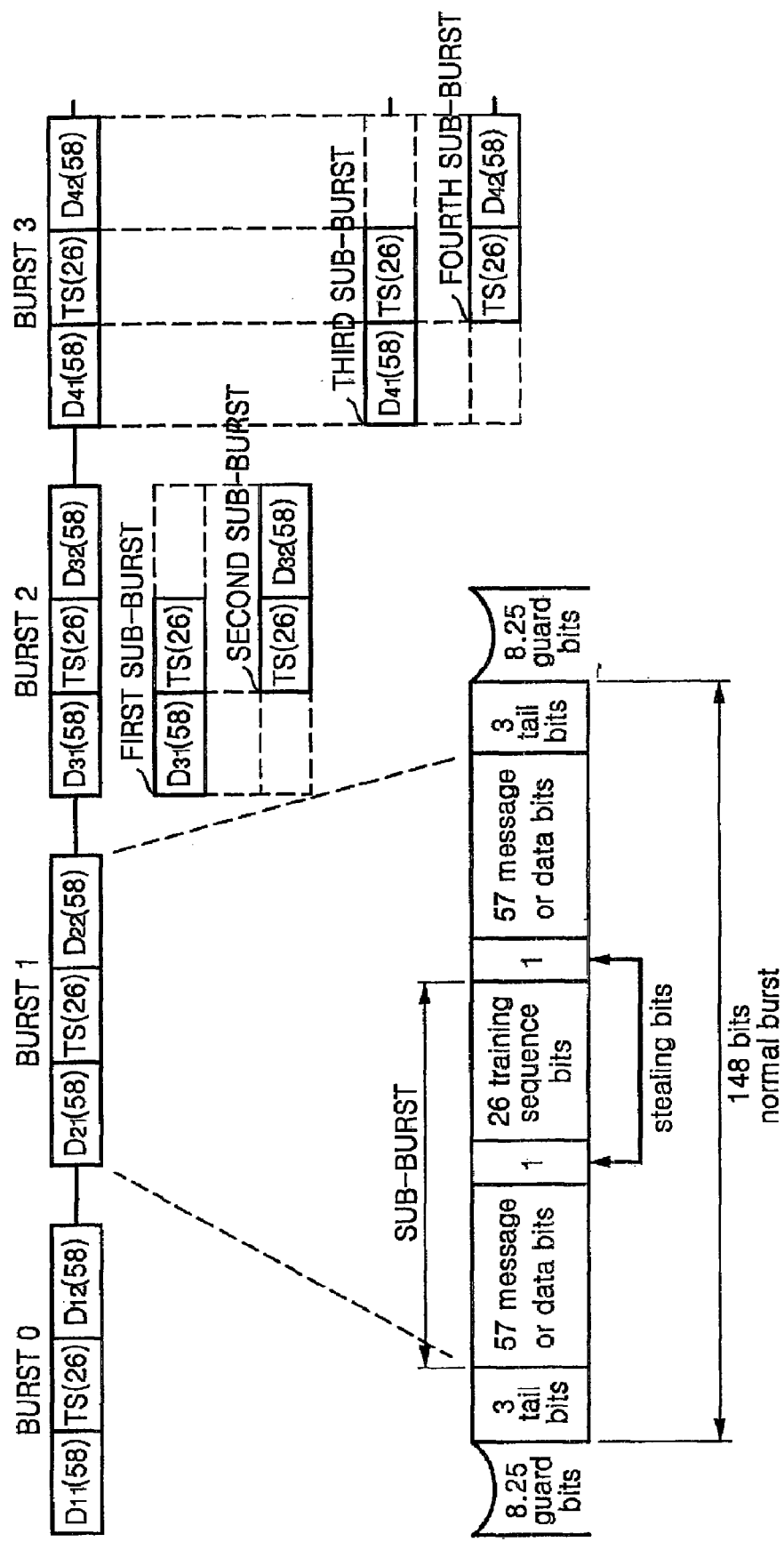
FIG. 2 is a view illustrating the concept of a sub-burst according to an exemplary embodiment of the present invention.

FIG. 1 is a block diagram of a terminal 100 of a wireless communication system according to an exemplary embodiment of the present invention. FIG. 2 is a view illustrating the concept of a sub-burst according to an exemplary embodiment of the present invention. Referring to FIGS. 1 and 2, the terminal 100 (e.g., a receiver) includes an antenna 101, a demodulator 110, a switch 120, a de-interleaver 130, a decoder 140, a block decoder 150, and a controller 160.

The antenna 101 receives a message that is output by a base station via a control channel, and outputs the message to the demodulator 110. The control channel may be a paging channel of a GSM, a common control channel, or a broadcast control channel.

The demodulator 110 receives the message from the antenna 101 in response to a control signal DCS, demodulates the message, and outputs the demodulated message to the switch 120. The demodulator 110 also outputs an indication signal IIF that indicates a state of the control channel to the controller 160. The demodulator 110 may also perform an equalization function which equalizes the demodulated signal and outputs the equalized signal to the switch 120. The demodulator 110 may receive four bursts on a burst-by-burst basis in response to the control signal DCS, which is output by the controller 160, or receive only one or more of the four bursts on a burst-by-burst basis that are placed on position(s) calculated by the controller 160.

Typically, a normal burst is made up of 156.25 bits (=148 bits+8.25 bits). In other words, a normal burst is an array of 3 tail bits, 57,data bits, 1 stealing bit, 26 training sequence bits, 1 stealing bit, 57 data bits, 3 tail bits, and 8.25 guard bits.

Referring to FIG. 2, a sub-burst denotes a data block that includes 57 data bits, 1 stealing bit, and 26 training sequence bits. Accordingly, each burst is divided into two sub-bursts. Each data block $D_{i1}$ (or $D_{i2}$) (where i denotes an integer from 1 to 4) includes 57 data bits and 1 stealing bit.

The demodulator 110 outputs at least one of a signal-to-noise ratio (SNR) or Doppler frequency of at least one of a first burst (i.e., a burst 0) or a second burst (i.e., a burst 1) as the indication signal IIF to the controller 160.

The controller 160 calculates the number of sub-bursts to be used during a next decoding and position(s) of the sub-bursts, based on at least one of the SNRs or Doppler frequencies of at least one of the first or second bursts. The calculated number of sub-bursts may be 1, 2, 3, or 4.

For example, the controller 160 may select, as two sub-bursts to be used during a next decoding, either a first sub-burst (i.e., an array of 58 data bits $D_{31}$ and 26 training sequence bits TS) and a second sub-burst (i.e., an array of 26 training sequence bits TS and 58 data bits $D_{32}$), or the first sub-burst and a third sub-burst (i.e., an array of 58 data bits $D_{41}$ and 26 training sequence bits TS), or the first sub-burst and a fourth sub-burst (i.e., an array of 26 training sequence bits TS and 58 data bits $D_{42}$). The controller 160 may select, as three sub-bursts to be used during the next decoding, either the first through third sub-bursts or the first, third, and fourth sub-bursts.

The demodulator 110 is enabled in response to the control signal DCS output by the controller 160 and can only receive burst(s) that are placed at the position(s) calculated by the controller 160.

The switch 120 can be implemented as a 1×n switch (where n denotes a natural number, for example, 4) and outputs the message (for example, demodulated burst) demodulated by the demodulator 110 to corresponding buffers 131 through 137 in response to a switching control signal SCS output by the controller 160.

For example, in response to the switching control signal SCS, the switch 120 transmits the first burst (i.e., burst 0) to the buffer 131, the second burst (i.e., burst 1) to the buffer 133, at least one of the first and second sub-bursts to the buffer 135, and at least one of the third and fourth sub-bursts to the buffer 137. When the buffer 135 receives only one sub-burst, i.e., only the first sub-burst or only the second sub-burst, the area of the buffer 135 other than an area thereof occupied by the received sub-burst is filled with "0". When the buffer 137 receives only one sub-burst, i.e., only the third sub-burst or only the fourth sub-burst, the area of the buffer 137 other than an area thereof occupied by the received sub-burst is filled with "0".

In response to the switching control signal SCS, the switch 120 may transmit a third burst (i.e., burst 2) to the buffer 135 and a fourth burst (i.e., burst 3) to the buffer 137. The data stored in each of the buffers 131 through 137 may be deleted in units of a burst or a sub-burst in response to a deletion control signal ECS output by the controller 160. The data stored in each of the buffers 131 and 133 may be deleted before a receipt of the first burst (i.e., burst 0). Each of the buffers 131 through 137 stores and buffers a burst or a sub-burst received from the switch 120.

A selection circuit 139 selectively outputs signals output by the buffers 131 through 137, in response to a selection signal SEL output by the controller 160. The selection circuit 139 may be implemented as a MUX.

The de-interleaver 130 includes the buffers 131 through 137 and the selection circuit 139. The de-interleaver 130 receives and de-interleaves a signal output from the demodulator 110.

The decoder 140 decodes a signal output by the selection circuit 139 in response to a decoding control signal CSD and outputs a decoded signal. When the decoder 140 is implemented as a Viterbi decoder, the decoder 140 convolutionally decodes the signal output by the selection circuit 139 and outputs the convolutionally decoded signal.

The block decoder 150 receives the signal decoded by the decoder 140 and recovers the paging message. The block decoder 150 provides a message state (MMS) of the recovered paging message to the controller 160.

When the recovery of the paging message is successful, the MMS is good. When the recovery of the paging message has failed (i.e., when an error is generated during the recovery), the MMS is bad. The MMS is provided to the controller 160. For convenience of explanation, it is illustrated in the embodiment of FIG. 1 that both the decoder 140 and the block decoder 150 operate in response to the single decoding control signal CSD. However, the decoder 140 and the block decoder 150 may be enabled/disabled in response to different decoding control signals from the controller 160.

When the MMS is good, the controller 160 outputs a decoding control signal CSD for disabling the decoders 140 and 150. After the message is demodulated in units of a burst or a sub-burst, the controller 160 may output a decoding control signal CSD for enabling the decoders 140 and 150.

Figure 3:
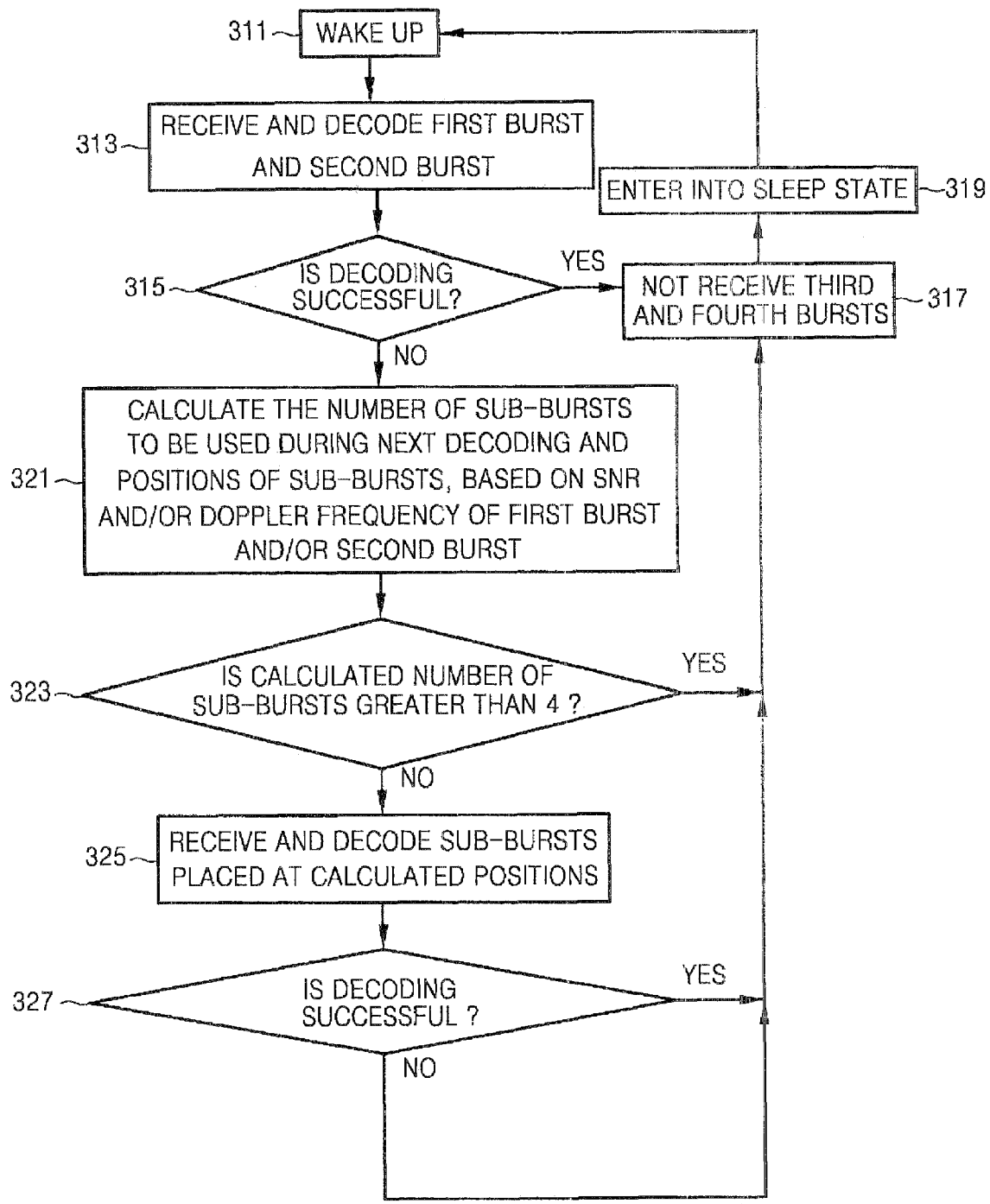
FIG. 3 is a flowchart illustrating a decoding method according to an exemplary embodiment of the present invention.

FIG. 3 is a flowchart illustrating a decoding method according to an exemplary embodiment of the present invention. The decoding method will be described with reference to FIGS. 1 through 3. When the terminal 100 awakes from a sleep state (i.e., wakes up) in operation 311, the terminal 100 receives the first burst and the second burst and decodes the bursts to recover a paging message in operation 313.

In operation 315, the terminal 100 determines whether the decoding is successful. When the decoding is successful, the terminal 100 does not receive the third and fourth bursts, in operation 317. Then, in operation 319, the terminal 100 enters into the sleep state.

Alternatively, when the decoding has failed, the controller 160 calculates the number of sub-bursts to be used during a next decoding arid the position(s) of the sub-bursts, based on at least one of the SNR or Doppler frequency of at least one of the first burst or the second burst, in operation 321. The SNR and Doppler frequency are output by the demodulator 110.

In operation 323, the controller 160 compares the calculated number of sub-bursts with a reference value (e.g., 4). When the calculated number of sub-bursts is greater than the reference value, the controller 160 outputs a control signal DCS for disabling an operation of the demodulator 110, so that the demodulator 110 cannot receive a message from a base station, in operation 317. Then, the controller 160 outputs to each of the decoders 140 and 150 the decoding control signal CSD for disabling each of the decoders 140 and 150. Then, in operation 319, the terminal 100 enters the sleep state.

When the calculated number of sub-bursts is equal to or smaller than the reference value, the controller 160 outputs to the demodulator 110 a control signal DCS used to receive the sub-burst(s) placed at the calculated position(s). In response to the control signal DCS, the demodulator 110 receives only the sub-burst(s) placed at the calculated position(s) and demodulates the received sub-burst(s).

When the state of the control channel is good, the terminal 100 can receive and decode only one sub-burst (e.g., a first sub-burst). Alternatively, when the state of the control channel is bad, the terminal 100 can receive and decode two, three, or four sub-bursts at the calculated positions.

The switch 120 outputs the message demodulated by the demodulator 110 to the buffers 131 through 137, in response to the switching control signal SCS output by the controller 160. The selection circuit 139 outputs the message stored in the buffers 131 through 137 to the decoder 140, in response to the selection signal SEL output by the controller 160.

The decoder 140 receives and decodes the message output by the buffers 131 through 137 in response to the decoding control signal CSD, to thereby recover the message received via the control channel, in operation 325.

When the paging message has been properly recovered by the block decoder 150 in operation 327, (i.e., the decoding is successful), the terminal 100 does not receive more bursts or sub-bursts in operation 317, and enters into the sleep state in operation 319. Even when the paging message has not been properly recovered by the block decoder 150 in operation 327, the terminal 100 does not receive more bursts or sub-bursts in operation 317, and enters into the sleep state in operation 319.

As described above, in a terminal and a decoding method according to at least one embodiment of the present invention, decoding can be performed in units of sub-bursts in an idle mode, so that the amount of current consumed in the idle mode, particularly, in a sleep state, can be significantly reduced.

The decoding method according to at least one embodiment the present invention can also be embodied as computer readable codes on a computer readable recording medium The computer readable recording medium is any data storage device that can store data which can be thereafter read by a computer system. The computer readable recording medium can also be distributed over network coupled computer systems so that the computer readable code is stored and executed in a distributed fashion. In addition, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of decoding a control channel in a wireless communication system, the method comprising;
   receiving, by a terminal of the system, a first and a second burst;
   calculating, by the terminal a number of sub-bursts to be used during a next decoding and their corresponding sub-burst positions within third and fourth bursts, based on a signal-to-noise ratio of at least one of the first burst or the second burst before the third burst and the fourth burst are received;
   comparing, by the terminal, the calculated number of sub-bursts with a reference value; and
   disabling receipt by the terminal of the sub-bursts of the third burst and the fourth burst having sub-burst positions that do not match the calculated sub-positions and based on a result of the comparison.

2. The method of claim 1, wherein when the calculated number of sub-bursts is greater than the reference value, the terminal enters into the sleep state.

3. The method of claim 2, wherein the reference value is 4.

4. The method of claim 1, further comprising:
   the terminal receiving and decoding the calculated number of sub-bursts to recover a message received via the control channel when the calculated number of sub-bursts is smaller than or equal to the reference value; and
   the terminal entering into the sleep state when the decoding is successful.

5. The method of claim 4, wherein the control channel is one of a paging channel of a global system for mobile communications (GSM), a common control channel, and a broadcast control cannel.

6. The method of claim 1, wherein each of the sub-bursts comprises data bits and training sequence bits.

7. A method of decoding a control channel in a wireless communication system, the method comprising;
   receiving, by a terminal of the system, a first and a second burst;
   calculating, by the terminal of the system, a number of sub-bursts to be used during a next decoding and their corresponding sub-burst positions within third and fourth bursts based on a least one of a signal-to-noise ratio or Doppler frequency of at least one of the first burst or the second burst before the third burst and the fourth burst are received; and
   entering into a sleep state, by the terminal., without receiving the third burst and the fourth burst transmitted via the control channel, when the calculated number of sub-bursts is greater than a reference value, and disabling receipt by the terminal of the sub-bursts of the third burst and the fourth sub-burst having sub-burst positions that do not match the calculated sub-positions and when the calculated number of sub-bursts is smaller than or equal to the reference value.

8. The method of claim 7, further comprising:
the terminal receiving and decoding the calculated number of sub-bursts to recover a message received via the control channel when the calculated number of sub-bursts is smaller than or equal to the reference value; and
the terminal entering into the sleep state when the decoding is successful.

9. A method of decoding a control channel in a wireless communication system, the method comprising;
receiving, by a terminal of the system, a first and a second burst;
calculating, by the terminal of the system, a number of sub-bursts to be used during a next decoding and their corresponding sub-burst positions within subsequently received third and fourth bursts, based on at least one of a signal-to-noise ratio or Doppler frequency of at least one of the first burst or the second burst before the third burst and the fourth burst are received;
receiving and decoding, by the terminal, only the sub-bursts of the third and fourth burst at the calculated positions to recover a message received via the control channel; and
entering into a sleep state by the terminal when the decoding is successful.

10. A decoding method performed by a terminal, the method comprising;
receiving, by the terminal, at least one of a first or a second burst;
calculating, by the terminal, a number of sub-bursts to be used during a next decoding and their corresponding sub-burst positions within subsequently received third and fourth bursts, based on at least one of a signal-to-noise ratio or Doppler frequency of at least one of the first burst or the second burst before the third burst and the fourth burst are received;
comparing, by the terminal, the calculated number of sub-bursts with a reference value; and
receiving and decoding, by the terminal, only the sub-bursts of the third and fourth burst at the calculated positions, or entering into a sleep state based on a result of the comparison.

11. The decoding method of claim 10, further comprising:
receiving and decoding the calculated number of sub-bursts to recover a message received via the control channel when the calculated number of sub-bursts is smaller than or equal to the reference value; and
entering into the sleep state when the decoding is successful.

12. The decoding method of claim 10, wherein when the calculated number of sub-bursts is greater than the reference value, the terminal enters into the sleep state.

13. A wireless communication terminal comprising:
a demodulator receiving and demodulating a message including a first burst and a second burst transmitted via a control channel in response to a control signal and outputting the demodulated message and an indication signal, wherein the indication signal is at least one of a signal-to-noise ratio or a Doppler frequency of at least one of the first burst or the second burst of the demodulated message before the third burst and the fourth burst are received;
a de-interleaver receiving and de-interleaving the demodulated message output by the demodulator;
a decoder decoding a signal output by the de-interleaver and outputting a decoded signal;
a block decoder decoding the decoded signal output by the decoder to recover a paging message and outputting the recovered paging message and a state of the recovered paging message; and
a controller calculating a number of sub-bursts to be used during a next decoding and their corresponding sub-burst positions within a third burst and a fourth burst of another message to be subsequently received by the demodulator, based on the indication signal, and performing one of an operation of outputting the control signal for controlling an enable/disable operation of the demodulator and an operation of making the terminal enter into a sleep state, based on the result of the calculation,
wherein the enable operation is performed for the sub-bursts of the third and fourth bursts whose sub-burst positions match the calculated positions, and
wherein the disable operation is performed for the sub-bursts of the third and fourth sub-bursts that do not match the calculated positions.

14. The wireless communication terminal of claim 13, wherein when the calculated number of sub-bursts is smaller than or equal to a reference value, the controller outputs to the demodulator the control signal for enabling the demodulator so that the sub-bursts at the calculated positions are received as the message.

15. The wireless communication terminal of claim 14, wherein when the calculated number of sub-bursts is greater than the reference value, the controller outputs to the demodulator the control signal for disabling the demodulator.

16. The wireless communication terminal of claim 14, wherein when the calculated number of sub-bursts is greater than the reference value, the controller makes the terminal enter into the sleep state.

17. The wireless communication terminal of claim 13, wherein the controller determines whether the terminal is to enter into the sleep state, based on the state of the recovered paging message.

18. The wireless communication terminal of claim 13, wherein the indication signal is a signal-to-noise ratio or Doppler frequency of each of the first and second bursts.

* * * * *